US008891516B2

(12) United States Patent
Jain et al.

(10) Patent No.: US 8,891,516 B2
(45) Date of Patent: Nov. 18, 2014

(54) EXTENDED LINK AGGREGATION (LAG) FOR USE IN MULTIPLE SWITCHES

(71) Applicant: International Business Machines Corporation, Armonk, NY (US)

(72) Inventors: Vinit Jain, Austin, TX (US); Dayavanti G. Kamath, Santa Clara, CA (US); Abhijit P. Kumbhare, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/742,267

(22) Filed: Jan. 15, 2013

(65) Prior Publication Data
US 2014/0198649 A1 Jul. 17, 2014

(51) Int. Cl.
H04L 12/50 (2006.01)
H04Q 11/00 (2006.01)
H04L 12/891 (2013.01)

(52) U.S. Cl.
CPC ..................................... H04L 47/41 (2013.01)
USPC ........... 370/386; 370/225; 370/252; 370/360; 370/381

(58) Field of Classification Search
USPC .......... 370/217, 221, 225, 252, 360, 381, 386
See application file for complete search history.

(56) References Cited

U.S. PATENT DOCUMENTS

| 2008/0037418 | A1 | 2/2008 | Cole et al. | |
| 2009/0109998 | A1* | 4/2009 | Vinayagam et al. | 370/465 |
| 2011/0228767 | A1 | 9/2011 | Singla et al. | |
| 2011/0299536 | A1* | 12/2011 | Cheng et al. | 370/392 |
| 2012/0195187 | A1 | 8/2012 | Ashihara et al. | |
| 2013/0100854 | A1 | 4/2013 | Tatikonda et al. | |
| 2014/0133486 | A1* | 5/2014 | Sivasankar et al. | 370/392 |

FOREIGN PATENT DOCUMENTS

| CN | 102014019 A | 4/2011 |
| CN | 102549970 | 7/2012 |
| EP | 2487591 | 8/2012 |
| JP | 201181588 | 4/2011 |
| WO | WO2011043270 | 4/2011 |
| WO | 2011105941 A1 | 9/2011 |
| WO | 2012062101 A1 | 5/2012 |
| WO | WO2013161366 | 10/2013 |

OTHER PUBLICATIONS

International Search Report and Written Opinion from PCT Application No. PCT/IB2013/060802 dated Mar. 11, 2014.
Carpenter et al., "Using the IPv6 Flow Label for Equal Cost Multipath Routing and Link Aggregation in Tunnels (RFC6438)," Internet Society Requests for Comment (RFCs), Nov. 1, 2011.

* cited by examiner

Primary Examiner — Benjamin H Elliott, IV
(74) Attorney, Agent, or Firm — Zilka-Kotab, PC (57) ABSTRACT

In one embodiment, a method for providing link aggregation (LAG) to heterogeneous switches includes receiving, at a switch controller, LAG requests forwarded by switches and determining that multiple LAG requests corresponding to a server have been received, grouping the multiple LAG requests into LAG groups according to a switch from which they were received and correlating all the LAG groups with the server, instructing each of the switches to setup a LAG group with the server according to the LAG groups determined by the switch controller, and creating alternate flows that correspond to flows through each of the switches to the server through direction from the switch controller. The switches may rely upon OpenFlow to communicate with the switch controller, in some approaches. In addition, other methods for providing LAG to heterogeneous switches are also described, along with systems and computer program products which provide LAG to heterogeneous switches.

15 Claims, 4 Drawing Sheets

FIG. 4

EXTENDED LINK AGGREGATION (LAG) FOR USE IN MULTIPLE SWITCHES

BACKGROUND

The present invention relates to data center infrastructure, and more particularly, this invention relates to extending link aggregation to multiple switches without restriction to vendor or number.

Network packet switches use Link Aggregation (LAG) to create a higher bandwidth port channel using multiple switch ports. LAG may be formed statically or dynamically. Static LAG has a fixed number of ports which are always members of the LAG if they are configured to be members of the LAG. Dynamic LAG, according to Link Aggregation and Control Protocol/LACP IEEE 802.3AD, provides facilities where port members may dynamically join and leave the dynamic LAG. Distributing or load balancing network traffic over the LAG ports is accomplished with algorithms, various different algorithms being currently available to control distribution across members in a LAG. Good algorithms provide efficient ways of hashing packets over the member ports, make sure each port is used equally, and ensure that no one port gets congested.

A switching processor, such as a switching application specific integrated circuit (ASIC) may be used to provide various algorithms which choose ports for network packets. Most of the algorithms are based upon tuples formed from information in the packet header of the packets. The tuples typically include a source media access control (MAC) address, a destination MAC address, a virtual local area network (VLAN) identifier, a source internet protocol (IP) address, a destination IP address, a source transport port, and a destination transport port. Some algorithms consider additional programmable factors to achieve better distribution of ports and/or other usage metrics.

Server to switch LAG is often used to achieve a high bandwidth pipe that is not prone to single link failures. This is also often done across multiple cooperating switches to protect against switch failures. However, conventionally, this requires the switches to be from the same vendor, and moreover, many times the switches need to be the same model. Often, LAG is also limited to only a pair of switches.

LAGs are important properties of the switches in a network and impact the performance of the switches and network in general. LAGs also alter the overall performance of the set of switches connected together. Accordingly, it would be beneficial to allow multiple switches to be connected together in a LAG to a server and to allow switches from multiple vendors and multiple model numbers to be grouped together in a LAG.

SUMMARY

In one embodiment, a system for providing link aggregation (LAG) to heterogeneous switches includes at least two switches connected to a server, each switch being connected via a plurality of connections, wherein the at least two switches are connected to one another via inter-switch links (ISLs). The server includes logic adapted for sending a LAG request on each connection to each of the at least two switches in order to create a plurality of LAG groups, one LAG group for each of the at least two switches including all connections therebetween. Each of the at least two switches includes logic adapted for receiving the LAG request from the server and logic adapted for forwarding the LAG request to a switch controller in electrical communication with the at least two switches. Also, the switch controller includes logic adapted for receiving the forwarded LAG requests from the at least two switches, logic adapted for determining that multiple LAG requests have been received corresponding to the server, logic adapted for grouping the multiple LAG requests into LAG groups according to a switch from which they were received, logic adapted for correlating all the LAG groups with the server, logic adapted for instructing each of the at least two switches to setup a LAG group with the server according to the LAG groups determined by the switch controller, and logic adapted for creating alternate flows that correspond to flows through each of the at least two switches to the server through direction from the switch controller.

In another embodiment, a computer program product for providing LAG to heterogeneous switches includes a computer readable storage medium having computer readable program code embodied therewith. The computer readable program code includes computer readable program code configured for receiving LAG requests forwarded by switches at a switch controller and determining that multiple LAG requests have been received corresponding to a server, computer readable program code configured for grouping the multiple LAG requests into LAG groups according to a switch from which they were received and correlating all the LAG groups with the server, computer readable program code configured for instructing each of the switches to set up a LAG group with the server according to the LAG groups determined by the switch controller, and computer readable program code configured for creating alternate flows that correspond to flows through each of the switches to the server through direction from the switch controller.

In yet another embodiment, a method for providing LAG to heterogeneous switches includes receiving, at a switch controller, LAG requests forwarded by switches and determining that multiple LAG requests corresponding to a server have been received, grouping the multiple LAG requests into LAG groups according to a switch from which they were received and correlating all the LAG groups with the server, instructing each of the switches to setup a LAG group with the server according to the LAG groups determined by the switch controller, and creating alternate flows that correspond to flows through each of the switches to the server through direction from the switch controller.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein.

Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system for providing link aggregation (LAG) to heterogeneous switches includes at least two switches connected to a server, each switch being connected via a plurality of connections, wherein the at least two switches are connected to one another via inter-switch links (ISLs). The server includes logic adapted for sending a LAG request on each connection to each of the at least two switches in order to create a plurality of LAG groups, one LAG group for each of the at least two switches including all connections therebetween. Each of the at least two switches includes logic adapted for receiving the LAG request from the server and logic adapted for forwarding the LAG request to a switch controller in electrical communication with the at least two switches. Also, the switch controller includes logic adapted for receiving the forwarded LAG requests from the at least two switches, logic adapted for determining that multiple LAG requests have been received corresponding to the server, logic adapted for grouping the multiple LAG requests into LAG groups according to a switch from which they were received, logic adapted for correlating all the LAG groups with the server, logic adapted for instructing each of the at least two switches to setup a LAG group with the server according to the LAG groups determined by the switch controller, and logic adapted for creating alternate flows that correspond to flows through each of the at least two switches to the server through direction from the switch controller.

In another general embodiment, a computer program product for providing LAG to heterogeneous switches includes a computer readable storage medium having computer readable program code embodied therewith. The computer readable program code includes computer readable program code configured for receiving LAG requests forwarded by switches at a switch controller and determining that multiple LAG requests have been received corresponding to a server, computer readable program code configured for grouping the multiple LAG requests into LAG groups according to a switch from which they were received and correlating all the LAG groups with the server, computer readable program code configured for instructing each of the switches to set up a LAG group with the server according to the LAG groups determined by the switch controller, and computer readable program code configured for creating alternate flows that correspond to flows through each of the switches to the server through direction from the switch controller.

In yet another general embodiment, a method for providing LAG to heterogeneous switches includes receiving, at a switch controller, LAG requests forwarded by switches and determining that multiple LAG requests corresponding to a server have been received, grouping the multiple LAG requests into LAG groups according to a switch from which they were received and correlating all the LAG groups with the server, instructing each of the switches to setup a LAG group with the server according to the LAG groups determined by the switch controller, and creating alternate flows that correspond to flows through each of the switches to the server through direction from the switch controller.

By using a switch controller, such as a controller operating OpenFlow software, switches in a network which are capable of communicating with the switch controller, may be grouped together in a LAG group so that communications may be split across multiple switches without restriction that these switches belong to the same vendor and/or are the same model. To accomplish this, intelligence or functionality may be built into the switch controller and LAG groups may be enabled across multiple switches that are compliant with whatever software the switch controller utilizes. In one embodiment, when the switch controller operates OpenFlow, the switches may be OpenFlow compliant in order to enable LAG usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
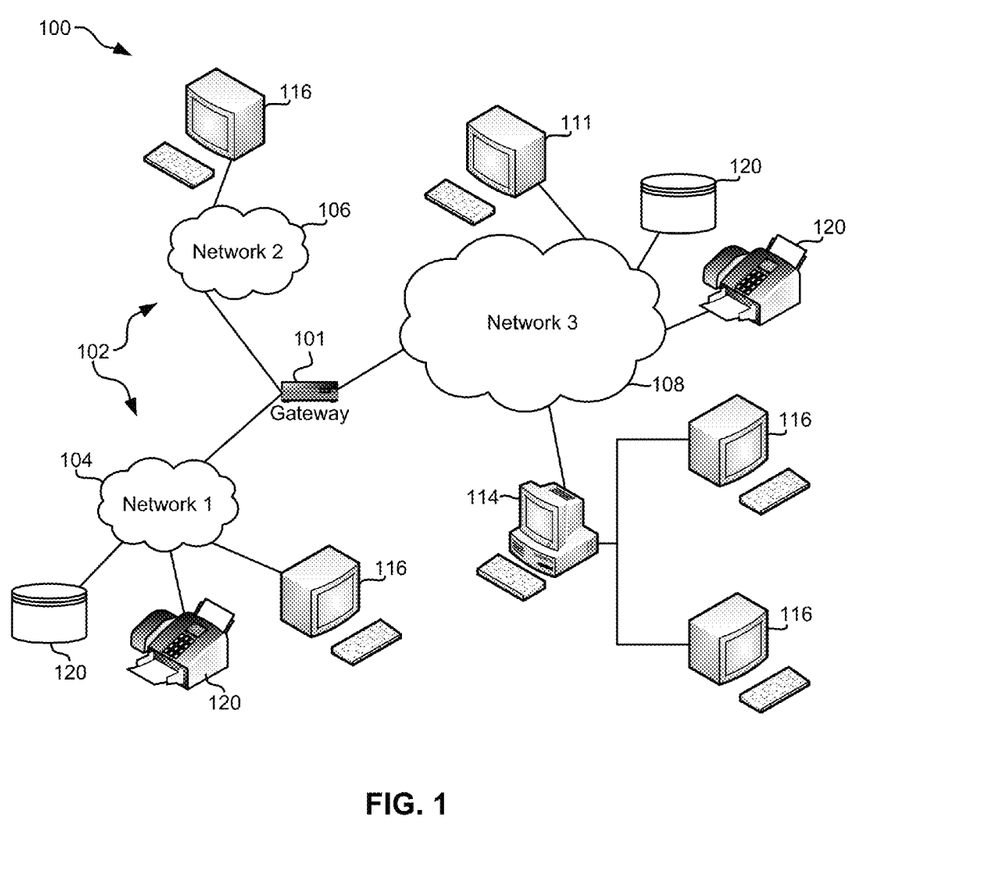
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
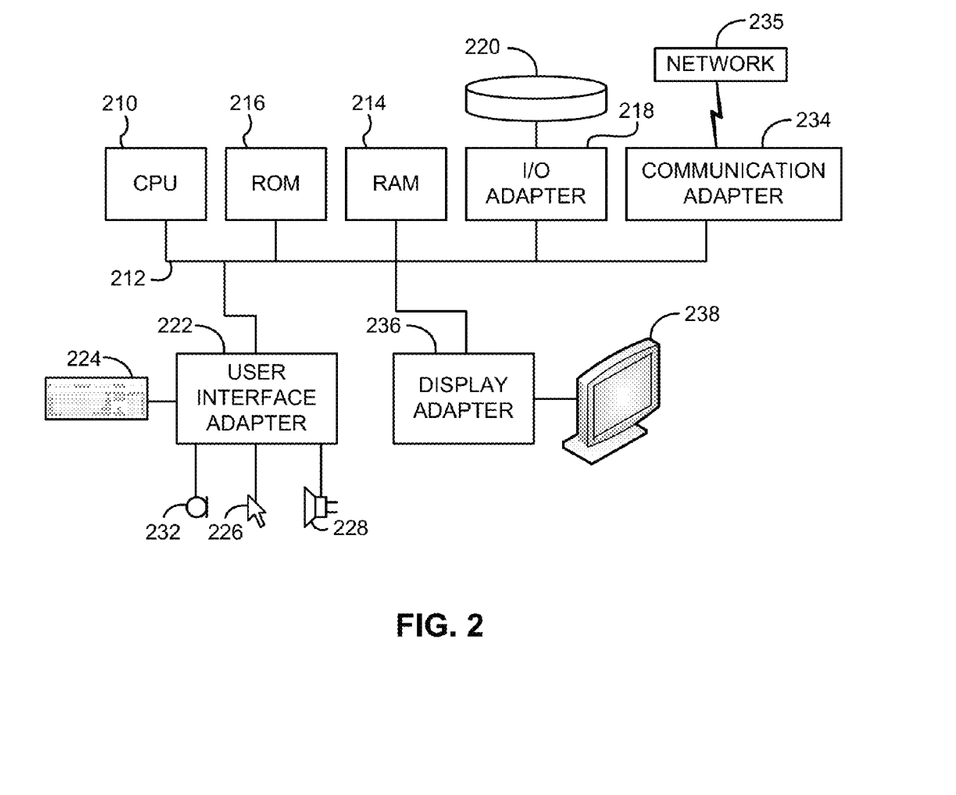
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
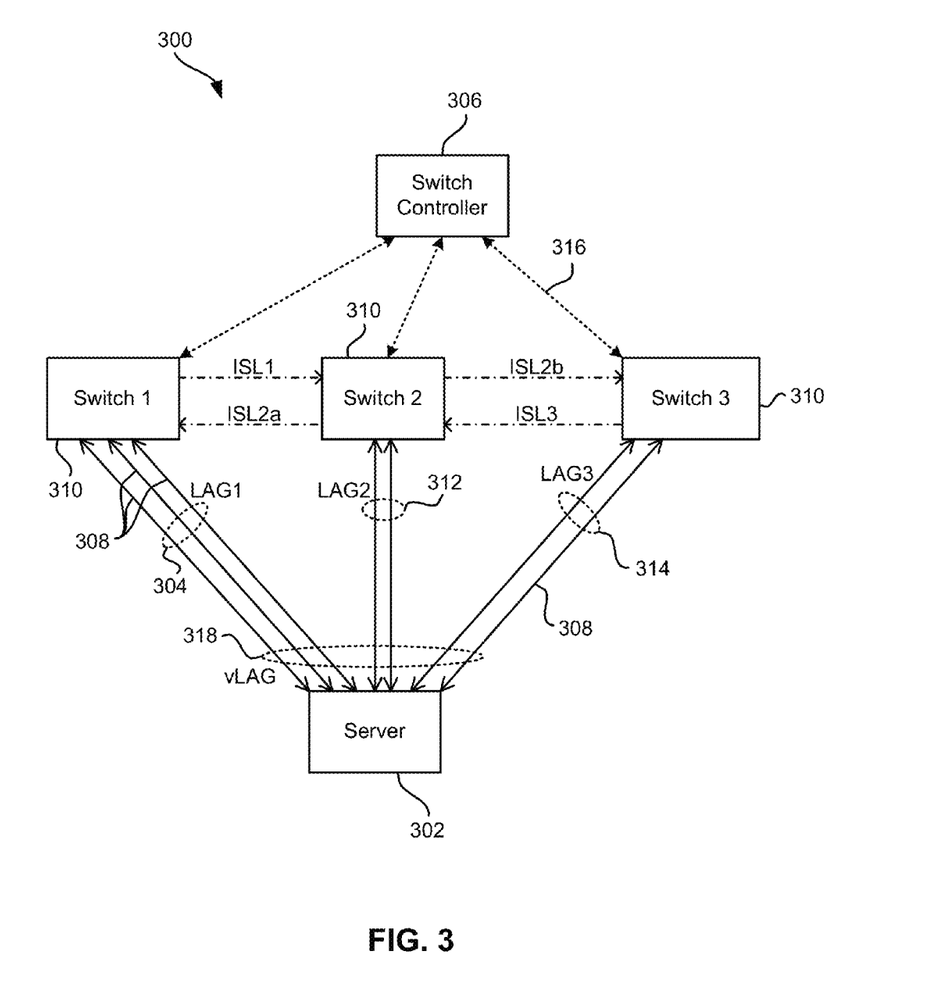
FIG. 3 is a simplified diagram of a system which has a plurality of switches connected to a server using multiple link aggregation (LAG) groups, according to one embodiment.

Now referring to FIG. 3, a system 300 is shown according to one embodiment, which has a plurality of switches 310 connected to a server 302 via connections 308. Each switch is connected, directly or indirectly (as denoted by dashed line connections 316) to a switch controller 306. The switch controller 306 is capable of receiving information from each of the switches 310 and is capable of sending information and/or commands to the switches 310.

According to one embodiment, the switch controller 306 may operate according to OpenFlow standards, and each switch 310 may be OpenFlow compliant. In other embodiments, the switch controller 306 may utilize a different application capable of controlling the switches 310 as would be known by one of skill in the art, such as Beacon, Jaxon, NOX, PDX, Maestro, etc.

When the server 302 sets up a LAG group, the server 302 sends a request to all switches 310 (as shown in FIG. 3, either Switch 1, Switch 2, or Switch 3) that the LAG group is to be set up with. Then, these switches 310 forward the LAG request to the switch controller 306. For any additional LAG groups, the server 302 may send out additional requests to the other switches 310 with which a LAG group is to be set up.

The switch controller 306 has visibility to multiple requests originating from the same server 302 which are sent by different switches 310, and because of this visibility, the switch controller 302 is able to correlate these requests with one another. The switch controller 306 separates the received requests into groups based on the switches 310 from which the received requests were forwarded from (as shown in FIG. 3, the switch controller 302 may separate the received requests into LAG1 304, LAG2 312, and LAG3 314 which correlate with Switch 1, Switch 2, and Switch 3, respectively).

Then, switch controller 302 instructs the switches 310 to setup LAG groups according to the separation (for example, LAG1 304, LAG2 312, and LAG3 314). The switches 310 create these LAG groups on their respective groups of ports which are connected to the server 302 and each switch (Switch 1, Switch 2, Switch 3) treat this grouped port as an entity from the perspective of packet forwarding using its flow table(s).

Existing mechanisms to balance traffic between multiple links may continue to be used, according to one embodiment. At this point each switch 310 has a LAG group set up for its connections with the server 302 (LAG1 304, LAG2 312, and LAG3 314 for Switch 1, Switch 2, and Switch 3, respectively). However, each individual switch 310 is still unaware that this LAG group is part of a multi-switch LAG 318 (which may also be referred to as a vLAG).

The switches 310 are also connected with each other using ISLs. These ISLs are provided between switches 310 for situations when a switch's connections 308 to the server 302 fail. For example, if the connections 308 between Switch 1 and the server 302 fail, packets may be sent to the neighboring Switch 2 via ISL1 and then sent down to the server 302. Likewise, if packets are to be sent from the server 302 up to Switch 1, and connections 308 between Switch 1 and the server 302 fail, the packets may be sent to the neighboring Switch 2 and then to the intended Switch 1 via ISL2a. This same arrangement is possible between Switch 2 and Switch 3 via ISL2b and ISL3, as shown in FIG. 3.

Once these LAG groups are set up by the server 302, for every flow (where flow indicates packets being sent from a source to a destination) on Switch 1 that has LAG1 304 as its destination port, the switch controller 306 will also create a corresponding flow on Switch 2 with LAG2 312 as its destination port, and/or on Switch 3 with LAG3 314 as its destination port. Similarly, for every flow on Switch 3 that has LAG3 314 as its destination port, the switch controller 306 will also create a corresponding flow on Switch 2 with LAG2 312 as its destination port, and/or on Switch 1 with LAG1 304 as its destination port. Also, for every flow on Switch 2 that has LAG2 312 as its destination port, the switch controller 306 will also create a corresponding flow on Switch 1 with LAG1 304 as its destination port and/or on Switch 3 with LAG3 314 as its destination port. The switch controller 306 may setup corresponding flows on one or more alternate switches, as desired by an administrator or as specified in settings for the switch controller. In this way, the switch controller 306 may setup multiple alternate paths for each flow through an individual switch.

Furthermore, in some embodiments, every flow on Switch 1 having LAG1 304 as its destination port may have a corresponding flow created on Switch 3 as well as Switch 2. In this embodiment, there may also be ISLs between Switch 1 and Switch 3 (which are not shown in FIG. 3). Other similar flows may be setup between any multiple number of switches in a LAG group.

When the switch controller 306 detects a situation where a LAG to the server 302 has failed (in order for a LAG to fail, all links in the LAG must have failed), any flow directed to the failed LAG is redirected across an ISL to a neighboring switch 310 and then sent out along a LAG on the neighboring switch 310.

For example, assume that all connections 308 between the server 302 and Switch 1 have failed. In this example, the switch controller 306 changes all flows that are on Switch 1 that have a destination designated as LAG1 304 and redirects the flows to ISL1 to be redirected to a neighboring switch 310, e.g., Switch 2. In a situation where all connections 308 between Switch 2 and the server 302 fail, the switch controller 302 may redirect the flows on Switch 2 designated destination of LAG2 312 to either Switch 1 or Switch 3. In another example, Switch 3 may be connected to another switch (e.g., Switch 4) and these switches may have ISLs therebetween, thereby creating a system where two switches work in tandem, one as backup for the other, in case all of the switch's connections to the server fail.

When the switch controller 306 detects that LAG1 has recovered (at least 1 connection 308 between the server 302 and Switch 1 is functioning again), the switch controller 306 restores all the flows that had the destination switched from LAG1 304 to ISL2a to (to be handled by Switch 2) back to LAG1 304 (to be handled by Switch 1).

In this way, the server 302 has the ability to receive and send flows through any switches 310 in the vLAG 318, regardless of whether the connections 308 between the individual switches 310 and the server 302 are functional, as long as one connection 308 in the vLAG 318 is still functioning.

Each switch 310 uses one or more flow tables to direct the switch how to handle incoming packets. The flow table(s) may be altered in order for the switch 310 to redirect flows according to the embodiments described herein.

A maximum number of ports in a LAG group may vary. Some exemplary numbers of maximum ports in a LAG group may be 2, 6, 10, 16, 32, 64, etc., and may be related to the particular switching processor which is used in the switch 310. The switching processor, in various embodiments, may support a minimum of 32 LAG groups, 64 LAG groups, 128 LAG groups, 256 LAG groups, etc. In addition, as previously described, LAG groups may be static or dynamic in nature.

Figure 4:
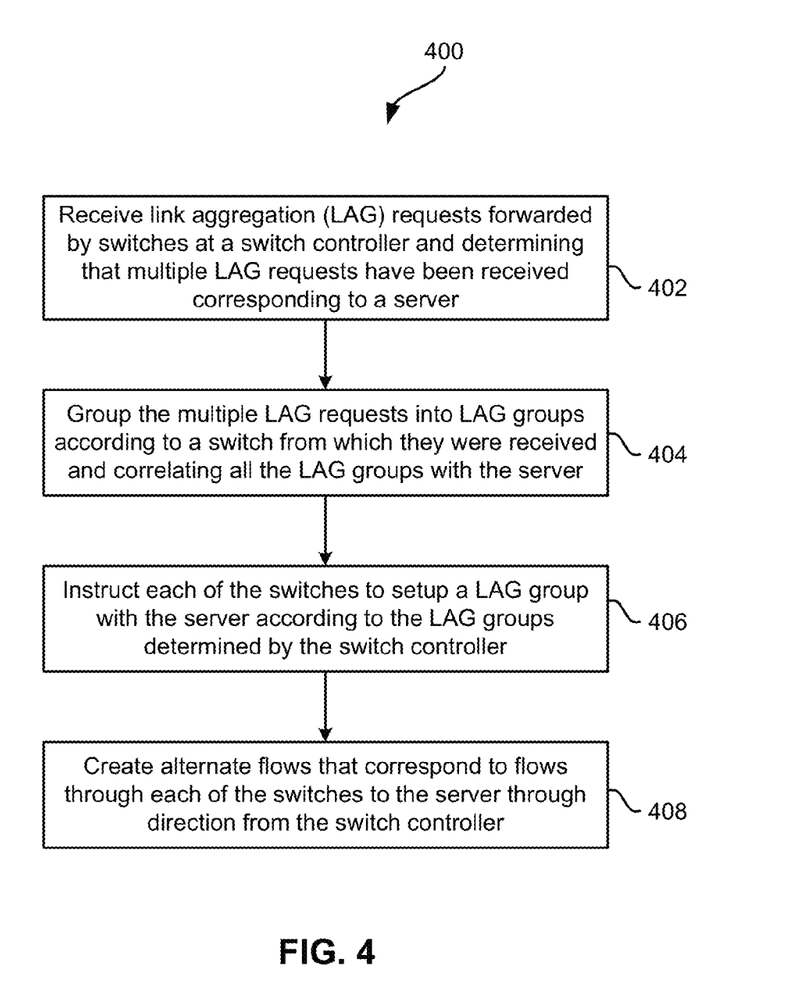
FIG. 4 is a flowchart of a method, according to one embodiment.

Now referring to FIG. 4, a flowchart of a method 400 for exchanging LAG information between peer switches, according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in one embodiment, the method 400 may be partially or entirely performed by a processor, such as a switching ASIC or a CPU, of a switch in a LAG group relationship with another peer switch.

As shown in FIG. 4, method 400 may initiate with operation 402, where LAG requests forwarded by switches are received at a switch controller and it is determined that multiple LAG requests have been received corresponding to a server. For example, it may be determined that multiple LAG requests have been received for the same server, in which case a correlation may be established between that server and the multiple LAG requests received.

According to one embodiment, the switch controller may be adapted to operate according to OpenFlow standards, and the switches may be OpenFlow compliant.

In another embodiment, the server and each of the switches may balance traffic across the plurality of connections therebetween according to any algorithm known in the art.

In operation 404, the multiple LAG requests are grouped into LAG groups according to a switch from which they were received and all the LAG groups are correlated with the server. In this way, multiple LAG groups may be dictated which may then be set up between the server and the switches.

In operation 406, each of the switches is instructed to setup a LAG group with the server according to the LAG groups determined by the switch controller. All members of a LAG group respond to the server using a universal indicator, such as a common key, to convey to the server that these are part of a multi-switch LAG (vLAG).

In operation 408, alternate flows that correspond to flows through each of the switches to the server are created through direction from the switch controller. In this way, the other switches do not need to go through the process of learning flows that one of the switches in the group has already learned.

When a LAG fails, the switch controller updates rules on the corresponding switch to cause traffic intended for the failed LAG to be directed through the ISL to an adjacent switch such that the traffic is delivered using the LAG of the adjacent switch. In this way, in case a LAG fails, there is a backup switch that may be utilized, along with its LAG to the server, in order to redirect traffic flow that is intended for the failed LAG.

When a failed LAG recovers, the switch controller creates copies of flow entries from an adjacent switch that indicate the LAG port as their destination to enable use of the recovered LAG.

According to one embodiment, the method 400 may further comprise determining when a first LAG between the server and a first switch has failed and redirecting any traffic flow having the first LAG as a destination to a second LAG between a second switch and the server via an ISL between the first switch and the second switch. In this way, the failed LAG can be avoided while still delivering traffic to its intended destination utilizing a backup LAG.

According to a further embodiment, the method 400 may further comprise determining when the first LAG has recovered and returning the redirected traffic flow back to the first LAG. In this way, the flow may be sent back to the first LAG after it is no longer failed so that load balancing may be performed across the various LAGs again, using the vLAG.

In more embodiments, referring again to FIG. 4, any or all operations of method 400 may be implemented in a system, a switch, a device, or a computer program product.

For example, in one embodiment, a system for providing LAG to heterogeneous switches comprises at least two switches connected to a server, each switch being connected via a plurality of connections, and a switch controller connected to the switches. The at least two switches are connected to one another via ISLs, and the server comprises logic adapted for sending a LAG request on each connection to each of the at least two switches in order to create a plurality of LAG groups, one LAG group for each of the at least two switches including all connections therebetween. Each of the at least two switches comprises logic adapted for receiving the LAG request from the server and logic adapted for forwarding the LAG request to a switch controller in electrical communication with the at least two switches. The switch controller comprises logic adapted for receiving the forwarded LAG requests from the at least two switches, logic adapted for determining that multiple LAG requests have been received corresponding to the server, logic adapted for grouping the multiple LAG requests into LAG groups according to a switch from which they were received, logic adapted for correlating all the LAG groups with the server, logic adapted for instructing each of the at least two switches to setup a LAG group with the server according to the LAG groups determined by the switch controller, logic adapted for creating alternate flows that correspond to flows through each of the at least two switches to the server utilizing the ISLs between the at least two switches, and logic adapted for writing these alternate flows into one or more flow tables accessible to each of the at least two switches.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system for providing link aggregation (LAG) to heterogeneous switches, the system comprising:
at least two switches connected to a server, each switch being connected via a plurality of connections to the server, wherein the at least two switches are connected to one another via one or more inter-switch links (ISLs),
wherein the server comprises logic configured to:
send a LAG request on each connection to each of the at least two switches in order to create a plurality of LAG groups, one LAG group per switch including all connections therebetween,
wherein each of the at least two switches comprises logic configured to:
receive the LAG request from the server; and
forward the LAG request to a switch controller in electrical communication with the at least two switches, and
wherein the switch controller comprises logic configured to:
receive the forwarded LAG requests from the at least two switches;
determine that multiple LAG requests have been received, from more than one switch, corresponding to the server;
group connections referenced by each of the multiple LAG requests into separate LAG groups according to a particular switch from which a particular LAG request was received;

correlate all the separate LAG groups with the server and form a multi-switch LAG group comprising all the separate LAG groups;

instruct each of the at least two switches to setup a LAG group with the server according to the separate LAG groups determined by the switch controller; and create, as directed by the switch controller, for a first flow through a first switch via a first LAG group to the server, one or more alternate flows through one or more second switches via one or more second LAG groups connected to the server.

2. The system as recited in claim 1, wherein the switch controller is configured to operate according to OpenFlow standards, and wherein the at least two switches are Open-Flow compliant.

3. The system as recited in claim 1, wherein the server and each of the at least two switches balance traffic across the plurality of connections therebetween.

4. The system as recited in claim 1, wherein the logic of the switch controller is further configured to:

determine when the first LAG group between the server and the first switch has failed; and redirect any traffic flow having the first LAG group as a destination to a first of the one or more second LAG groups between a first of the one or more second switches and the server via an ISL between the first switch and the first of the one or more second switches.

5. The system as recited in claim 4, wherein the logic of the switch controller is further configured to:

determine when the first LAG group has recovered; and return the redirected traffic flow back to the first LAG group when the first LAG group has recovered.

6. A computer program product for providing link aggregation (LAG) to heterogeneous switches, the computer program product comprising a non-transitory computer readable storage medium having computer readable program code embodied therewith, the computer readable program code being configured to cause a processor to:

receive LAG requests forwarded by switches at a switch controller and determine that multiple LAG requests have been received corresponding to a common server;

group connections referenced by each of the multiple LAG requests into separate LAG groups according to a particular switch from which a particular LAG request was received and correlate all the separate LAG groups with the server and form a multi-switch LAG group comprising all the separate LAG groups;

instruct each of the switches to set up a LAG group with the server according to the separate LAG groups determined by the switch controller; and create, as directed by the switch controller, for a first flow through a first switch via a first LAG group to the server, one or more alternate flows through one or more second switches via one or more second LAG groups connected to the server.

7. The computer program product as recited in claim 6, wherein the switch controller is configured to operate according to OpenFlow standards, and wherein the switches are OpenFlow compliant.

8. The computer program product as recited in claim 6, wherein the server and each of the switches balance traffic across the plurality of connections therebetween.

9. The computer program product as recited in claim 6, wherein the computer readable program code is further configured to cause the processor to:

determine when the first LAG group between the server and the first switch has failed; and redirect any traffic flow having the first LAG group as a destination to a first of the one or more second LAG groups between a first of the one or more second switches and the server via an ISL between the first switch and the first of the one or more second switches.

10. The computer program product as recited in claim 9, wherein the computer readable program code is further configured to cause the processor to:

determine when the first LAG group has recovered; and return the redirected traffic flow back to the first LAG when the first LAG group has recovered.

11. A method for providing link aggregation (LAG) to heterogeneous switches, the method comprising:

receiving, at a switch controller, LAG requests forwarded by switches and determining that multiple LAG requests corresponding to a common server have been received;

grouping connections referenced by each of the multiple LAG requests into separate LAG groups according to a particular switch from which a particular LAG request was received and correlating all the separate LAG groups with the server and form a multi-switch LAG group comprising all the separate LAG groups;

instructing each of the switches to setup a LAG group with the server according to the separate LAG groups determined by the switch controller; and creating, as directed by the switch controller, for a first flow through a first switch via a first LAG group to the server, one or more alternate flows through one or more second switches via one or more second LAG groups connected to the server.

12. The method as recited in claim 11, wherein the switch controller is configured to operate according to OpenFlow standards, and wherein the switches are OpenFlow compliant.

13. The method as recited in claim 11, wherein the server and each of the switches balance traffic across the plurality of connections therebetween.

14. The method as recited in claim 11, further comprising:

determining when the first LAG group between the server and the first switch has failed; and redirecting any traffic flow having the first LAG group as a destination to a first of the one or more second LAG groups between a first of the one or more second switches and the server via an ISL between the first switch and the first of the one or more second switches.

15. The method as recited in claim 14, further comprising:

determining when the first LAG group has recovered; and returning the redirected traffic flow back to the first LAG when the first LAG group has recovered.

* * * * *